United States Patent [19]

Humpal

[11] Patent Number: 4,705,369

[45] Date of Patent: Nov. 10, 1987

[54] MIRROR MOUNT

[75] Inventor: Harold H. Humpal, San Ramon, Calif.

[73] Assignee: The United States of America as represented by the United States Department of Energy, Washington, D.C.

[21] Appl. No.: 842,573

[22] Filed: Mar. 21, 1986

[51] Int. Cl.[4] .......................... G02B 5/08; G02B 7/18
[52] U.S. Cl. ..................................... 350/636; 350/632; 350/639; 350/486; 248/476; 248/487; 248/480
[58] Field of Search .............. 350/636, 632, 639, 486, 350/637; 248/476, 474, 487, 480, 479, 481

[56] References Cited

U.S. PATENT DOCUMENTS 4,167,306 9/1979 Longland .......................... 350/636

FOREIGN PATENT DOCUMENTS 93114 7/1980 Japan .................................. 350/632

1092457 5/1984 U.S.S.R. .............................. 350/632

Primary Examiner—Jon W. Henry
Attorney, Agent, or Firm—Richard E. Constant

[57] ABSTRACT

A mirror mount (10) is provided that allows free pitch, yaw and roll motion of the mirror (28) while keeping the location of a point (56) on the surface of the mirror (28) fixed in the rest frame of reference of the mount (10). Yaw movement is provided by two yaw cylinders (30,32) that are bearing (52) mounted to provide rotation. Pitch and roll motion is provided by a spherically annular shell (42) that is air bearing (72,74) mounted to move between a clamp (60) and an upper pedestal bearing (44). The centers of curvature of the spherical surfaces of the shell (42) lie upon the point (56). Pitch motion and roll motion are separately and independently imparted to mirror (28) by a pair of pitch paddles (34) and a pair of roll paddles (36) that are independently and separately moved by control rods (76,80) driven by motors (78,82).

3 Claims, 5 Drawing Figures

MIRROR MOUNT

BACKGROUND OF THE INVENTION

The United States Government has rights in this invention pursuant to Contract No. W-7405-ENG-48 between the U.S. Department of Energy and the University of California for the operation of the Lawrence Livermore National Laboratory.

The invention described herein relates generally to apparatus for mounting mirrors, and more particularly to apparatus for mounting mirrors used to reflect and focus synchrotron radiation.

The basic theory of synchrotron radiation is given by Schwinger in Phys. Rev. 75, 1912 (1949). Synchrotron radiation is the electromagnetic radiation that is emitted by relativistic charged particles as they are made to travel along a circular path. A synchrotron is a device for producing synchrotron radiation by using a time-varying magnetic field to accelerate charged particles, such as electrons, along generally circular orbits. At any given particle energy and orbit radius, the amount of power radiated by a charged particle as synchrotron radiation is proportional to the inverse fourth power of the mass of the radiating particle. Thus, at similar particle energies and orbit radii, electrons emit about thirteen orders of magnitude more synchrotron radiation than do protons. Today many electron synchrotrons are no longer used to provide relativistic electrons for high-energy physics experimentation, but rather are exclusively dedicated to sunchrotron radiation research.

Synchrotron radiation is beamed forward in a narrow cone in the instantaneous direction of the velocity vector of the emitting particles. In practice, synchrotron radiation is made to exit from a synchrotron along multiple, evacuated lines-of-sight that extend tangentially from the circumference of the synchrotron's electron storage ring at magnetic bend points. In the usual situation where the storage ring is oriented horizontally, the synchrotron radiation beam is almost entirely naturally collimated within a very narrow vertical opening angle that is inversely proportional to the particle energy of the radiating electrons. For 2.5 GeV electrons, the vertical opening angle is approximately $2 \times 10^{-4}$ radians, which is very small.

The primary synchrotron radiation beams leaving the electron storage ring are of very high intensity, and exist as smooth, featureless continua of broad spectral bandwidth. Each of the primary beams is usually separated into several secondary beams for appropriate and efficient utilization. The separation process usually involves beam redirection and focusing, and often monochromatization to a single narrow wavelength range, and is commonly performed by various types and varieties of grazing incidence mirrors and gratings. Precise alignment is extremely critical to insure that all mirror functions are properly carried out in respect to the efficient and quantitatively predictable utilization of the radiation in the primary beam. The mirrors must be frequently realigned to new and precisely predetermined specifications, to accommodate different experimental configurations. Further, the mirrors must be maintained in a vacuum environment and may be used while in virtually any spatial orientation, such as on their side or even upside down, as compared to seemingly more conventional attitudes.

Ideally, synchrotron radiation mirrors should be mounted by means allowing freedom of motion while keeping the location of a single predetermined point on the surface of the mirror spatially fixed with respect to the locus of the central ray of the synchrontron radiation beam. It is pointed out that this beam locus is subject to certain apparently random spatial variations that appear to be related to small, uncontrolled changes in electron orbit that occur in the electron storage ring from time to time. It would be additionally extremely beneficial if a synchrotron radiation mirror mounting means allowed the mirror to be precisely, simply and quickly changed in attitude into any new and predetermined position.

SUMMARY OF THE INVENTION

It is therefore an object of the invention to provide an apparatus for mounting a mirror.

Another object of the invention is to provide an apparatus for mounting a mirror in an axially decoupled manner that allows freedom of motion of the mirror while keeping spatially fixed the location of a single predetermined point on the surface of the mirror.

A further object of the invention is to provide an apparatus for mounting a mirror in vacuum and in any spatial orientation, and that allows the mirror to be precisely, simply and quickly changed in attitude into any new and predetermined position.

Additional objects, advantages and novel features of the invention will be set forth in part in the description which follows, and in part will become apparent to those skilled in the art upon examination of the following or may be learned by practice of the invention. The objects and advantages of the invention may be realized and obtained by means of the instrumentalities and combinations particularly pointed out in the appended claims.

To achieve the foregoing and other objects and in accordance with the purpose of the present invention, as embodied and broadly described herein, the apparatus for mounting a mirror of this invention may comprise a mount that allows free and decoupled pitch, roll and yaw movement of the mirror, while maintaining a single predetermined point on the surface of the mirror, or indeed any given predetermined spatial point that is fixed in the rest frame of reference of the mirror, coincident upon, or occupying the same space as, a spatial point that is fixed in the rest frame of reference of the mount. The mount comprises a spherically annular shell assembly that is rigidly attached to the mirror, which may be maintained in vacuum. The centers of curvature of the two spherically annular shell surfaces are each coincident upon the above-mentioned predetermined point on the surface of the mirror. The mount further comprises a pedestal that extends through an internal opening that passes between the two spherical surfaces of tne annular shell assembly, and that has a convex spherical surface having the same radius of the curvature as, and snugly fits within, the inner concave spherical surface of the annular shell of the spherical shell assembly. A clamp, that is rigidly attached to the pedestal, has a concave spherical surface that snugly fits upon, and has the same radius of curvature as, the outer convex spherical surface of the spherically annular shell assembly. Two pitch paddles are rigidly attached to the spherically annular shell assembly on either side of the internal opening that passes through the annular shell. Similarly, and with a rigorously perpendicular orientation, a pair of roll paddles are also rigidly attached to the annular shell assembly. The pitch attitude of the mirror is controlled by means that move the two pitch paddles. Similar, but completely independent, means move the roll paddles and thereby control the roll attitude of the mirror. Thus the pitch and roll attitudes of the mirror are separately and independently controlled by means that are not interrelated. The yaw attitude of the mirror is separately controlled by rotating the pedestal about an axis that is stationary in the rest frame of reference of the mount and that passes through the center of curvature of the convex spherical surface of the pedestal. Because of this, the predetermined point on the surface of the mirror is kept fixed, or stationary, in the rest frame of reference of the mount, while the pitch, yaw and roll orientations of the mirror are all freely and independently adjustable.

Preferably, the spherical surfaces of the annular shell, the pedestal, and the clamp, that are snugly fitted within and rest upon one another, are provided with air bearing means to allow freedom of motion. The surfaces are clamped together when the mirror is in use. Because of this, the mirror may be mounted in any spatial orientation.

It is also preferable, in some embodiments of the invention, to provide the mirror mount with mutually independent means for controlling the overall position or location of the mount in three mutually orthogonal directions that are fixed with respect to the earth.

The benefits and advantages of the present invention, as embodied and broadly described herein, include, inter alia, the provision of a mirror mount that allows axially decoupled, rapid and precise changes in the positional attitude of the mounted mirror, which may be in vacuum and have any spatial orientation, while keeping the location of a single predetermined point on the surface of the mirror spatially fixed.

BRIEF DESCRIPTION OF THE DRAWINGS

The accompanying drawings, which are incorporated and form a part of the specification, illustrate an embodiment of the invention and, together with the description, serve to explain the principles of the invention. In the drawings.

DETAILED DESCRIPTION OF THE INVENTION

Figure 1:
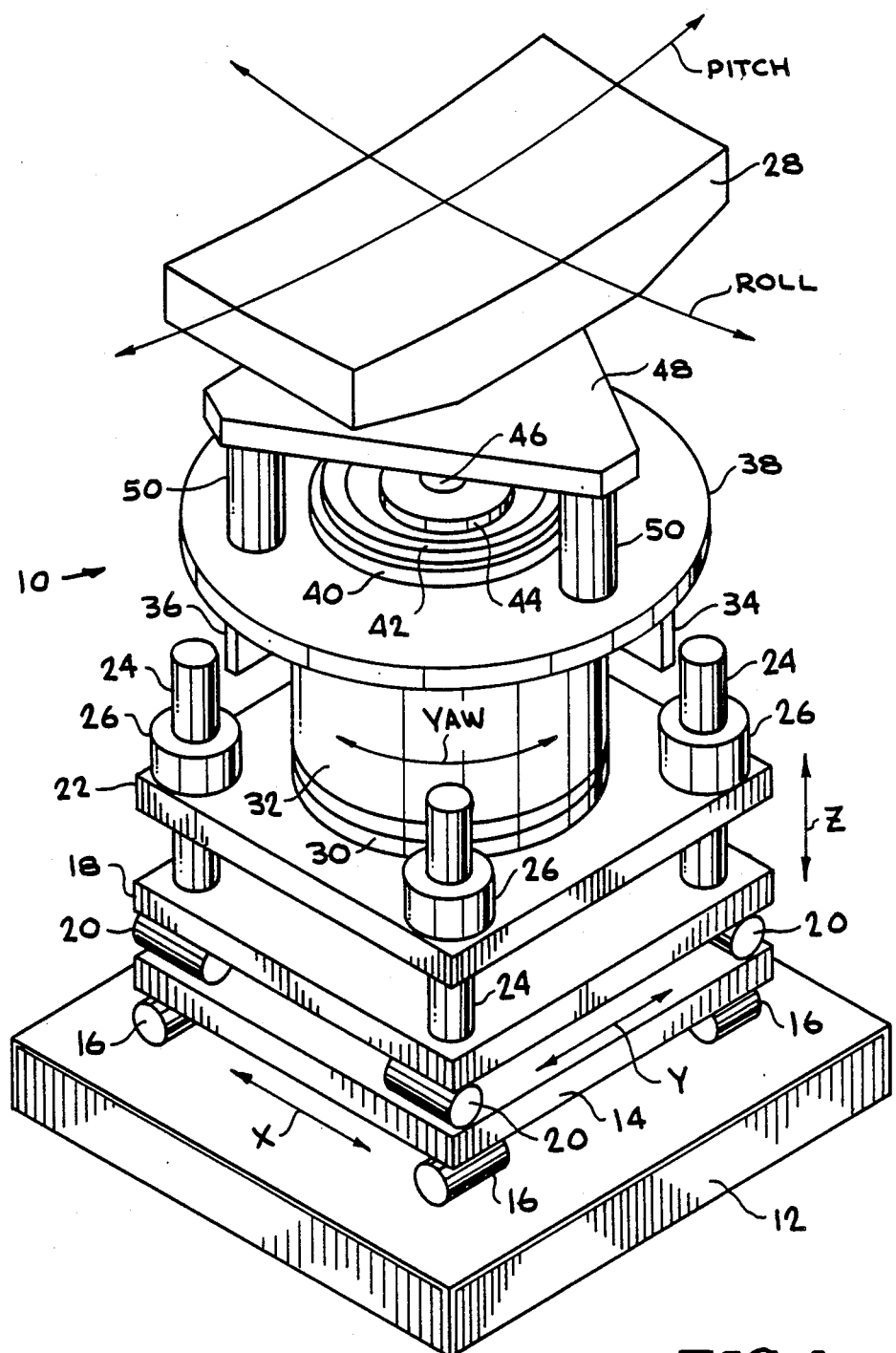
FIG. 1 is a partially schematic perspective view of a mirror mount made in accordance with the invention.

Reference will now be made in detail to the present preferred embodiment of the invention, an example of which is illustrated in the accompanying drawings. Reference is first made to FIG. 1 which shows a partially schematic perspective view of a mirror mount 10, made in accordance with the invention. It is particularly noted and emphasized that mount 10 can function in any spatial orientation, such as on its side or upside down, with respect to the upright attitude depicted in FIG. 1. The mount is schematically shown as resting on a platform 12, that is fixed, or stationary, in the frame of reference of the earth. Further, in some embodiments of the invention, platform 12 may be dynamically isolated from the earth. The positioning of mount 10 in the X linear direction is controlled by an X axis plate 14 mounted on X axis bearings 16, which are schematically represented. Similarly, the positioning of mount 10 in the Y linear direction is controlled by a Y axis plate 18 mounted on Y axis bearings 20, also schematically represented. Mount 10 is positioned in the up-down or Z linear direction by means of Z axis plate 22, that is supported by Z axis guide posts 24 and by Z axis bearings 26, schematically indicated. Bearings 16, 20 and 26 may be of any appropriate type or variety. These are well known in all engineering and mechanical arts. The X, Y and Z linear directions are mutually orthogonal and fixed in the frame of reference of the earth. The means for positioning mount 10, in orthogonal directions that are fixed with respect to the earth, are not limited to apparatus as schematically indicated in FIG. 1, but may be accomplished by any appropriate means.

The parts of mirror mount 10 that support a mirror 28 in a manner allowing free and decoupled pitch, roll and yaw movement are located on and above Z axis plate 22 of FIG. 1. The terms pitch, roll and yaw derive from nomenclature used to describe the complex motion of a ship at sea. Pitching is vertical angular rotation about a transverse horizontal axis; rolling is transverse angular rotation about a horizontal fore and aft axis; and yawing is horizontal angular rotation about a vertical axis. Yaw is controlled by the portions of mirror mount 10 comprised of an inner yaw cylinder 30 and an outer yaw cylinder 32, as will be fully described and explained hereinbelow. Pitch and roll are controlled by motion imparted to a pair of pitch paddles 34, and to a pair of roll paddles 36, that are attached to a pitch and roll plate 38. Only one member of each of paddle pairs 34 and 36 is shown in FIG. 1. Upper portions of a mounting ring 40, a spherically annular shell 42, an upper pedestal bearing 44, and a pedestal shaft 46, are also shown in FIG. 1. These parts will all be fully described and explained hereinbelow. Mirror 28 is directly attached to a support plate 48 tnat is, in turn, attached to pitch and roll plate 38 by a set of three pillars 50, two of which are shown in FIG. 1. Mirror 28, plate 48, plate 38 and pillars 50 together comprise a rigid assembly. Mirror 28 may, by means that are not shown, such as vacuum seals and bellows, which are well known, be kept isolated in a vacuum environment.

Figure 2:
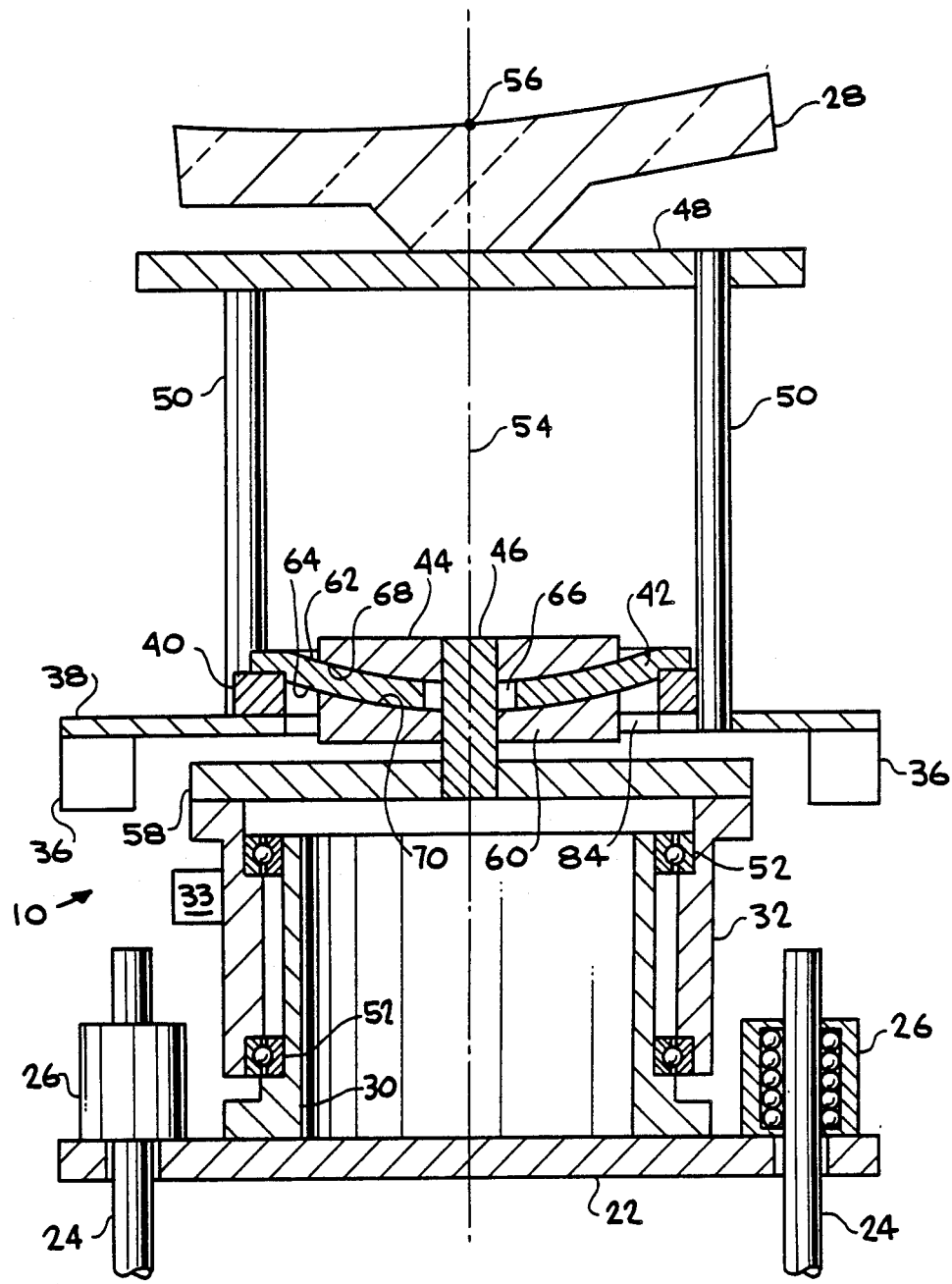
FIG. 2 is a partial cross-sectional front view of the mirror mount of FIG. 1, particularly showing the pitch, roll and yaw control portions of the mount.

Reference is now made to FIG. 2, which is a partial front view of mirror mount 10, showing the pitch, roll and yaw control portions of mount 10 in cross section. The depicted apparatus rests upon Z axis plate 22, with the Z axis bearings 26 and Z axis guide posts 24, partially shown. Inner yaw cylinder 30 is rigidly mounted upon Z axis plate 22. The outer yaw cylinder 32 is rotatably mounted upon inner yaw cylinder 30 by means of a pair of rolling element bearings 52. Outer yaw cylinder 32 is rotated with respect to inner yaw cylinder 30 by rotating means 33, which are schematically indicated, and may be of any appropriate type, such as a motor and pulley apparatus, as well known in the mechanical arts. Outer yaw cylinder 32 is thus mounted to rotate on an axis 54 that is stationary in the frame of reference of Z axis plate 22, and that passes through a point 56 that is on the surface of mirror 28. Once mount 10 has been finally positioned with respect to the X, Y and Z orthogonal directions, the axis of rotation 54 of outer yaw cylinder 32 is stationary with respect to any frame of reference rigidly attached to the earth. Because of this, the rest frame of reference of mount 10 may be considered to be stationary with respect to the earth.

A pedestal plate 58 is fixedly supported upon outer yaw cylinder 32. Pedestal plate 58 is part of an overall pedestal structure that additionally comprises pedestal shaft 46 and upper pedestal bearing 44, with these three parts all being rigidly attached to one another. Mirror 28, as described above, is directly attached to support plate 48, that is mounted upon pillars 50, which are attached rigidly to pitch and roll plate 38. Plate 38 is provided with a central aperture or hole 84, through which the overall pedestal structure projects. Mounting ring 40 is rigidly attached to pitch and roll plate 38 and rigidly supports spherically annular shell 42. A clamp 60, that is rigidly attached to pedestal shaft 46, further comprises structure of the mount 10.

Spherically annular shell 42 is thus rigidly attached to mirror 28. Shell 42 has an inner concave spherical surface 62 and an outer convex spherical surface 64. The centers of curvature of surfaces 62 and 64 are each constructed to be coincident upon point 56, on the surface of mirror 28. An opening 66 is provided on shell 42, passing between surfaces 62 and 64. As mentioned above, a second opening 84 is provided generally in the center of pitch and roll plate 38. Pedestal shaft 46 extends through openings 66 and 84. Upper pedestal bearing 44 has a convex spherical surface 68, having the same radius of curvature as surface 62 of shell 44, and snugly fits therewithin. Clamp 60 has a concave spherical surface 70, having tne same radius of curvature as surface 64 of shell 44, and snugly fits thereupon.

Figure 5:
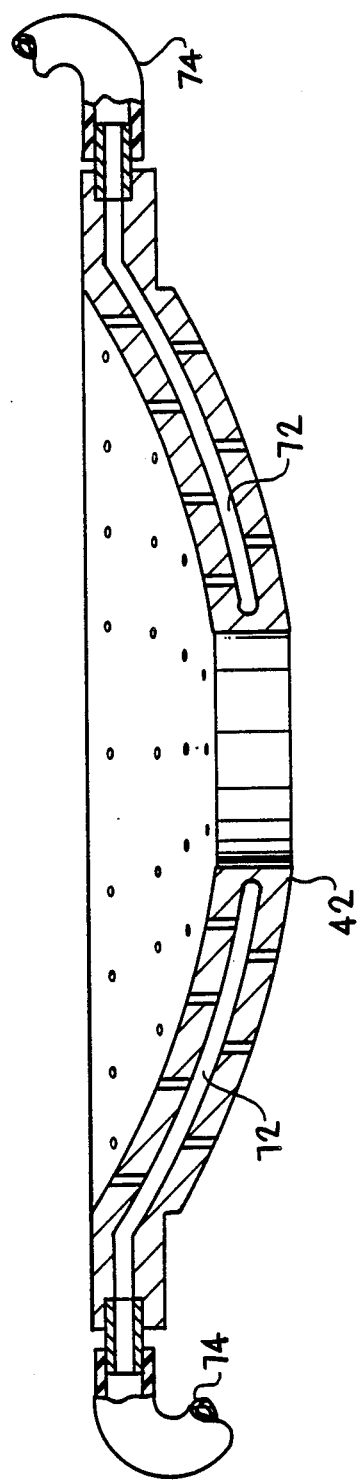
FIG. 5 is a schematic cross-sectional view of the spherically annular shell, showing its air bearing mechanism, of the mirror mount of FIG. 1.

Surfaces 62 and 68, and surfaces 64 and 70, are lubricated, or allowed to freely move with respect to one another, by any appropriate means, so that spherically annular shell 42 is allowed to slidingly move within, while being firmly held between, upper pedestal bearing 44 and clamp 60. In some embodiments of the invention, it is particularly advantageous if this is accomplished by air bearing means, as shown in FIG. 5, to which reference is now made. A cross-sectional view of spherically annular shell 42 is shown. Air distribution ducts 72, for the air bearing system, are supplied by air hoses 74, all of which are schematically indicated. Shell 42 is clamped in place by clamp 60 when mirror 28 is in use. Because of this feature, mirror mount 10 may be used in any spatial orientation.

Returning now to FIG. 2, it is apparent that the pitch and roll of mirror 28 may be controlled by imparting motion to pitch and roll plate 38, thereby causing spherically annular shell 42 to slide between upper pedestal bearing 44 and clamp 60. As this is accomplished, in any manner, the location of point 56, on the surface of mirror 28, remains fixed in the rest frame of reference of mount 10, which is taken to be the rest frame of reference of pedestal plate 58. Motion is imparted to pitch and roll plate 38, in the roll direction, by motion imparted to the pair of roll paddles 36 that are attached to plate 38. Pitch motion is controlled via a corresponding and orthogonally placed set of pitch paddles, which are not shown in FIG. 2.

Figure 3:
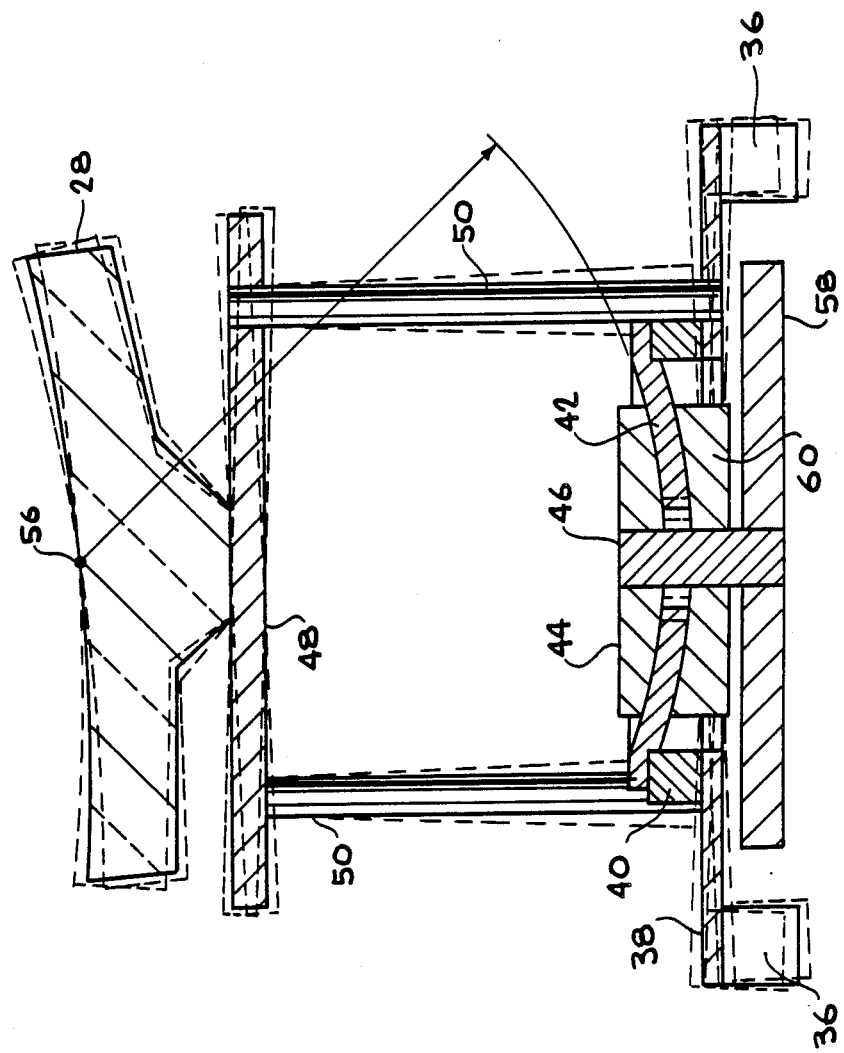
FIG. 3 is a partial cross-sectional front view of the mirror mount of FIG. 1, particularly showing the spherically annular shell assembly, the pedestal assembly, the clamp, and the roll paddles of the mount.

Reference is now made to FIG. 3 which is a cross-sectional view of the rigid structure comprised of mirror 28, plate 48, pillars 50, pitch and roll plate 38, paddles 36, ring 40, and spherically annular shell 42, showing how, as this structure moves, as indicated by dashed lines, the location of point 56 on the surface of mirror 28 is kept fixed in relation to an overall pedestal structure comprised of pedestal plate 58, pedestal shaft 46 and upper pedestal bearing 44, and, additionally, the clamp 60.

Figure 4:
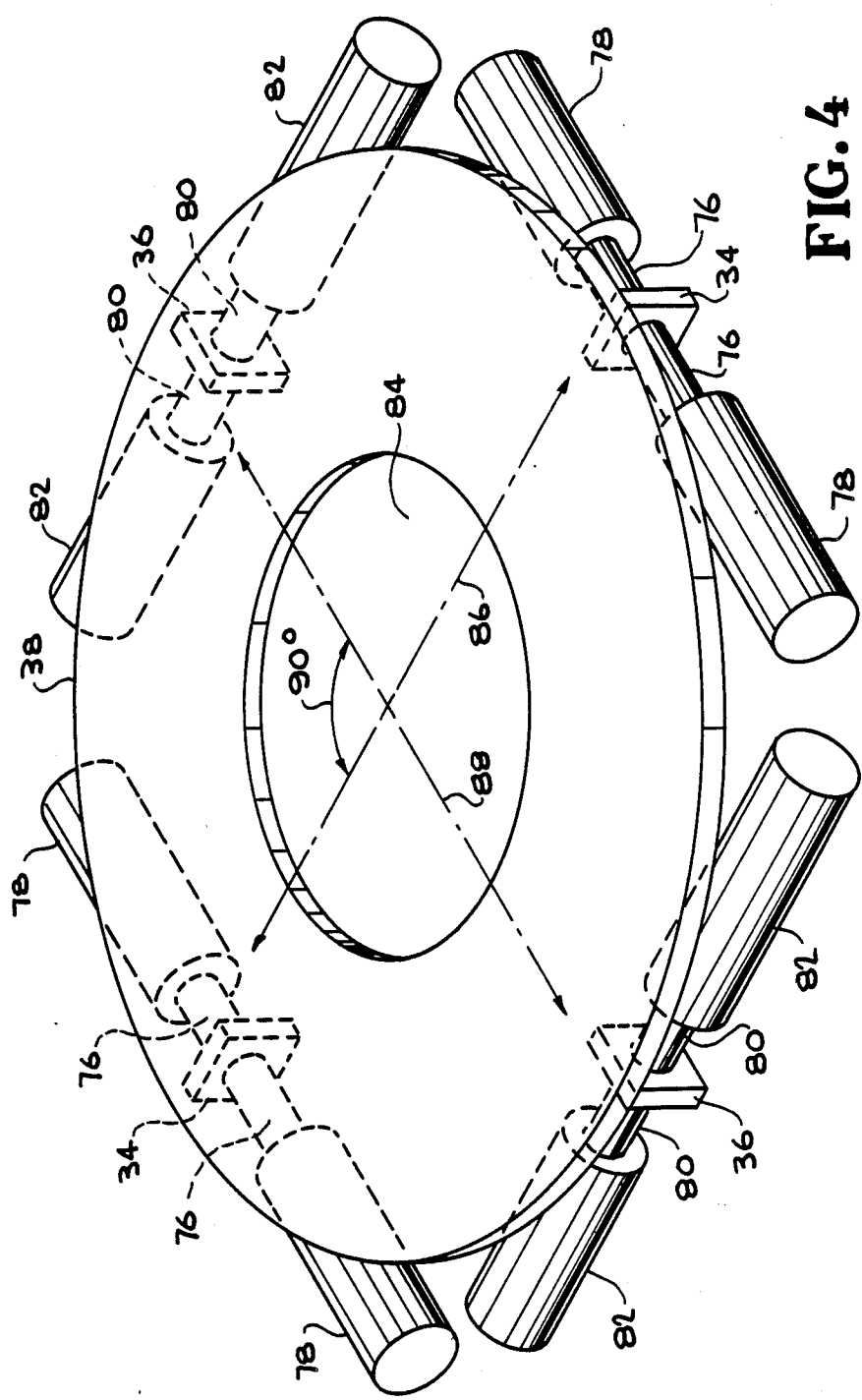
FIG. 4 is a partially schematic perspective view of the pitch and roll plate, the pitch and the roll paddles, the means for moving the pitch paddles, and the means for moving the roll paddles, of the mirror mount of FIG. 1.

Reference is finally made to FIG. 4 which shows a perspective view of pitch and roll plate 38 and, attached thereto, pair of pitch paddles 34 and pair of roll paddles 36. Pitch paddles 34 are moved by a group of four pitch control rods 76 which are driven by a group of four pitch control motors 78, as schematically indicated. Similarly, roll paddles 36 may be moved by a group of four roll control rods 80 which are driven by a group of four roll control motors 82, as also schematically indicated. The opening 84, provided in the center of plate 38, is generally located between pitch paddles 34, and also is located generally between roll paddles 36. A line of direction 86 extending between pitch paddles 34, and a line of direction 88 extending between roll paddles 36, are rigorously perpendicular. Rods 76 and motors 78 provide a means for moving pitch paddles 34 so that only the pitch attitude of mirror 28, not shown in FIG. 4, and not the roll attitude, is controlled. Similarly, rods 80 and motors 82 provide a means for moving roll paddles 36 so that only the roll attitude of mirror 28, and not the pitch attitude, is controlled.

It is thus appreciated that in accordance with the invention as herein described and shown in FIGS. 1 to 5, a mirror mount 10 is provided tnat allows axially decoupled pitch, roll and yaw movement of the mirror, while keeping point 56, that is fixed on the surface of mirror 28, at rest or stationary in the rest frame of reference of mount 10. Mount 10, that may have any spatial orientation, further provides a freedom of motion to mirror 28, that may be kept in a vacuum environment, allowing mirror 28 to be precisely, simply and quickly changed in attitude into any new and predetermined position.

The foregoing description of a preferred embodiment of the invention has been presented for purposes of illustration and description. It is not intended to be exhaustive or to limit the invention to the precise form disclosed, and many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A mount for supporting an object, in a manner allowing decoupled pitch, roll and yaw movement of the object, subject to the constraint that a first spatial point fixed in the rest frame of reference of the object, and a second spatial point fixed in the rest frame of reference of the mount, are maintained as coincident, said mount comprising:

a spherically annular shell assembly, rigidly attached to said object, having an inner concave spherical surface and an outer convex spherical surface, with the center of curvature of said inner concave spherical surface and the center of curvature of said outer convex spherical surface both being coincident upon said first spatial point, and with said spherically annular shell assembly having an internally disposed opening that passes between said inner concave spherical surface and said outer convex spherical surface;

a pedestal, extending through said opening, and having a convex spherical surface at one end thereof, of the same radius of curvature as the inner concave spherical surface of said shell assembly, and which snugly fits within the inner concave spherical surface of said shell assembly;

a clamp, rigidly attached to said pedestal, and having a concave spherical surface at one end thereof, of the same radius of curvature as the outer convex spherical surface of said shell assembly, and which snugly fits upon the outer convex spherical surface of said shell assembly;

a pair of pitch paddles, rigidly attached to said spherically annular shell assembly, and positioned so that the internally disposed opening of said shell assembly is generally located between said pair of pitch paddles;

a pair of roll paddles, rigidly attached to said spherically annular shell assembly, and positioned so that the internally disposed opening of said shell assembly is generally located between said pair of roll paddles, with the line of direction extending between said pair of roll paddles, and the line of direction extending between said pair of pitch paddles, being rigorously perpendicular;

means for moving said pair of pitch paddles so that only the pitch attitude, and not the roll attitude, of said object, is controlled;

means for moving said pair of roll paddles so that only the roll attitude, and not the pitch attitude, of said object, is controlled; and means for rotating said pedestal, to control the yaw attitude of said object, about an axis that is both stationary in the rest frame of reference of said mount and that passes through the center of curvature of the convex spherical surface of said pedestal, so that the center of curvature of the convex spherical surface of said pedestal is coincident upon both said second spatial point and said first spatial point.

2. A mount, as recited in claim 1, further comprising air bearing means for lubricating, by lifting and separating, the locus of contact between the inner concave spherical surface of said spherically annular shell assembly and the convex spherical surface of said pedestal, and the locus of contact between the outer convex spherical surface of said spherically annular shell assembly and the concave spherical surface of said clamp.

3. A mount, as recited in claim 2, further comprising:

means for controlling the positioning of said mount in a first linear direction fixed with respect to the earth;

means for controlling the positioning of said mount in a second linear direction fixed with respect to the earth; and means for controlling the positioning of said mount in a third linear direction fixed with respect to the earth, where said first, second and third linear directions are mutually orthogonal.

* * * * *